United States Patent
Tan et al.

(10) Patent No.: US 10,410,770 B2
(45) Date of Patent: Sep. 10, 2019

(54) INSULATION ASSEMBLY

(71) Applicant: Tyco Electronics (Shanghai) Co. Ltd., Shanghai (CN)

(72) Inventors: Yuezhong Tan, Shanghai (CN); Lizhang Yang, Shanghai (CN); Rong Zhang, Shanghai (CN); Peng Li, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 15/816,633

(22) Filed: Nov. 17, 2017

(65) Prior Publication Data

US 2018/0096757 A1    Apr. 5, 2018

Related U.S. Application Data

(63) Continuation of application No. PCT/IB2016/052942, filed on May 19, 2016.

(30) Foreign Application Priority Data

| May 19, 2015 | (CN) | ........................... 2015 1 0256186 |
| Jun. 12, 2015 | (CN) | ........................... 2015 1 0324087 |
| Aug. 30, 2016 | (CN) | ........................... 2016 1 0190671 |

(51) Int. Cl.
| *H01B 17/58* | (2006.01) |
| *C08J 5/04* | (2006.01) |
| *C08J 7/04* | (2006.01) |
| *H01B 3/28* | (2006.01) |
| *H01B 3/40* | (2006.01) |
| *H01B 3/47* | (2006.01) |

(Continued)

(52) U.S. Cl.
CPC .............. *H01B 17/58* (2013.01); *C08J 5/043* (2013.01); *C08J 7/047* (2013.01); *H01B 3/28* (2013.01); *H01B 3/40* (2013.01); *H01B 3/47* (2013.01); *C08J 2300/12* (2013.01); *C08J 2363/00* (2013.01); *C08J 2363/02* (2013.01); *C08J 2483/04* (2013.01); *H01B 17/265* (2013.01); *H01B 17/325* (2013.01)

(58) Field of Classification Search
CPC ............. H01B 17/58; H01B 3/28; C08J 5/043
USPC ....................................................... 174/167
See application file for complete search history.

(56) References Cited

U.S. PATENT DOCUMENTS 3,544,707 A * 12/1970 Gamble ............... H01B 17/301
174/142
4,290,457 A *  9/1981 Campbell, Jr. ......... F27D 3/022
138/147

(Continued)

FOREIGN PATENT DOCUMENTS

WO    2008074166 A1    6/2008

OTHER PUBLICATIONS

Notification of PCT Search Report and Written Opinion, dated Jul. 18, 2016 11 pages.

*Primary Examiner* — Dhiru R Patel
(74) *Attorney, Agent, or Firm* — Barley Snyder (57) ABSTRACT

An insulation assembly comprises an insulation pipe, an insulation umbrella group, and an insulation base. The insulation pipe has a first end and a second end opposite to the first end. The insulation umbrella group is formed on an outer wall of the insulation pipe. The insulation base is made of an insulating material and connected to the first end of the insulation pipe.

30 Claims, 6 Drawing Sheets

(51) Int. Cl.
   *H01B 17/26*   (2006.01)
   *H01B 17/32*   (2006.01)

(56) References Cited

U.S. PATENT DOCUMENTS

| | | | | |
|---|---|---|---|---|
| 5,130,495 | A | * | 7/1992 | Thompson ............ H02G 15/068 174/142 |
| 5,466,891 | A | * | 11/1995 | Freeman ................ H01B 17/28 174/11 BH |
| 5,483,023 | A | | 1/1996 | Barnes |
| 5,909,005 | A | * | 6/1999 | Boston .................... H01R 4/66 174/51 |
| 6,218,627 | B1 | * | 4/2001 | Shindo .................. H01B 17/26 174/142 |
| 6,693,242 | B1 | * | 2/2004 | Bailey .................... H01B 17/26 174/138 F |
| 8,981,222 | B2 | * | 3/2015 | Bohlin ................ H02G 15/046 174/167 |
| 9,048,652 | B2 | * | 6/2015 | Hoglund .............. H02G 15/046 |

* cited by examiner

INSULATION ASSEMBLY

CROSS-REFERENCE TO RELATED APPLICATIONS

This application is a continuation of PCT International Application No. PCT/IB2016/052942, filed on May 19, 2016, which claims priority under 35 U.S.C. § 119 to Chinese Patent Application No. 201510256186.1, filed on May 19, 2015, Chinese Patent Application No. 201510324087.2, filed on Jun. 12, 2015, and Chinese Patent Application No. 201610190671.8, filed on Mar. 30, 2016.

FIELD OF THE INVENTION

The present invention relates to an insulation assembly and, more particularly, to an insulation assembly for a conductor.

BACKGROUND

An insulation assembly is commonly used in the electric power industry for electric insulation. The insulation assembly generally comprises an insulation pipe, an insulation umbrella group formed on the insulation pipe, and a metal flange connected to an end of the insulation pipe.

The cost of the metal flange is very high, however, which increases the cost of the entire insulation assembly. Further, a gap often forms between the metal flange and the insulation pipe because the metal flange and the insulation pipe are made of different materials with different thermal expansion coefficients. As a result, an insulation gas, for example sulfur hexaflouride (SF6), filled in the insulation pipe leaks out through the gap between the metal flange and the insulation pipe. The metal flange also is very heavy in weight and reduces the electrical performance of the insulation assembly.

SUMMARY

An insulation assembly according to the invention comprises an insulation pipe, an insulation umbrella group, and an insulation base. The insulation pipe has a first end and a second end opposite to the first end. The insulation umbrella group is formed on an outer wall of the insulation pipe. The insulation base is made of an insulating material and connected to the first end of the insulation pipe.

BRIEF DESCRIPTION OF THE DRAWINGS

The invention will now be described by way of example with reference to the accompanying figures, of which.

DETAILED DESCRIPTION OF THE EMBODIMENT(S)

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

Figure 1:
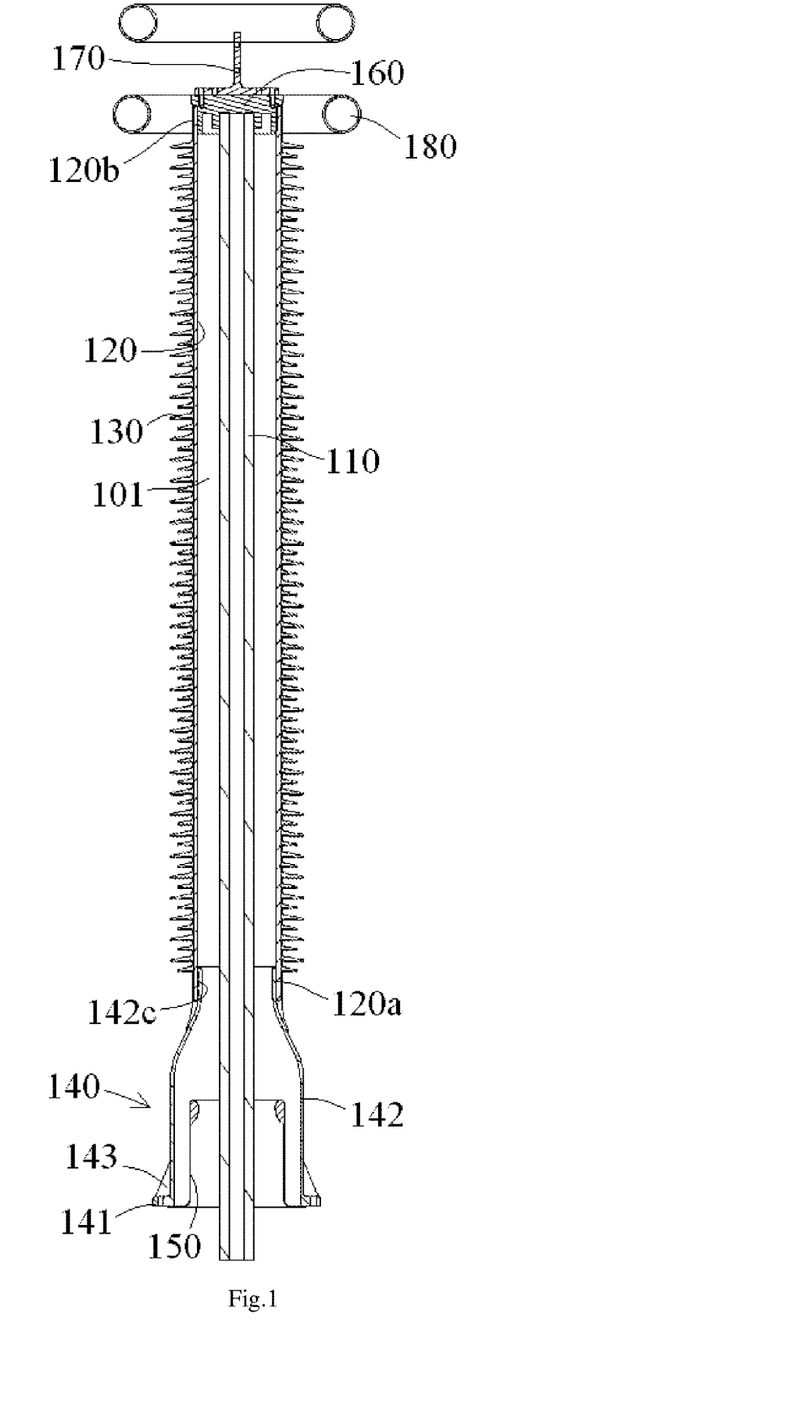
FIG. 1 is a sectional view of an insulation assembly according to an embodiment of the invention.
Figure 2:
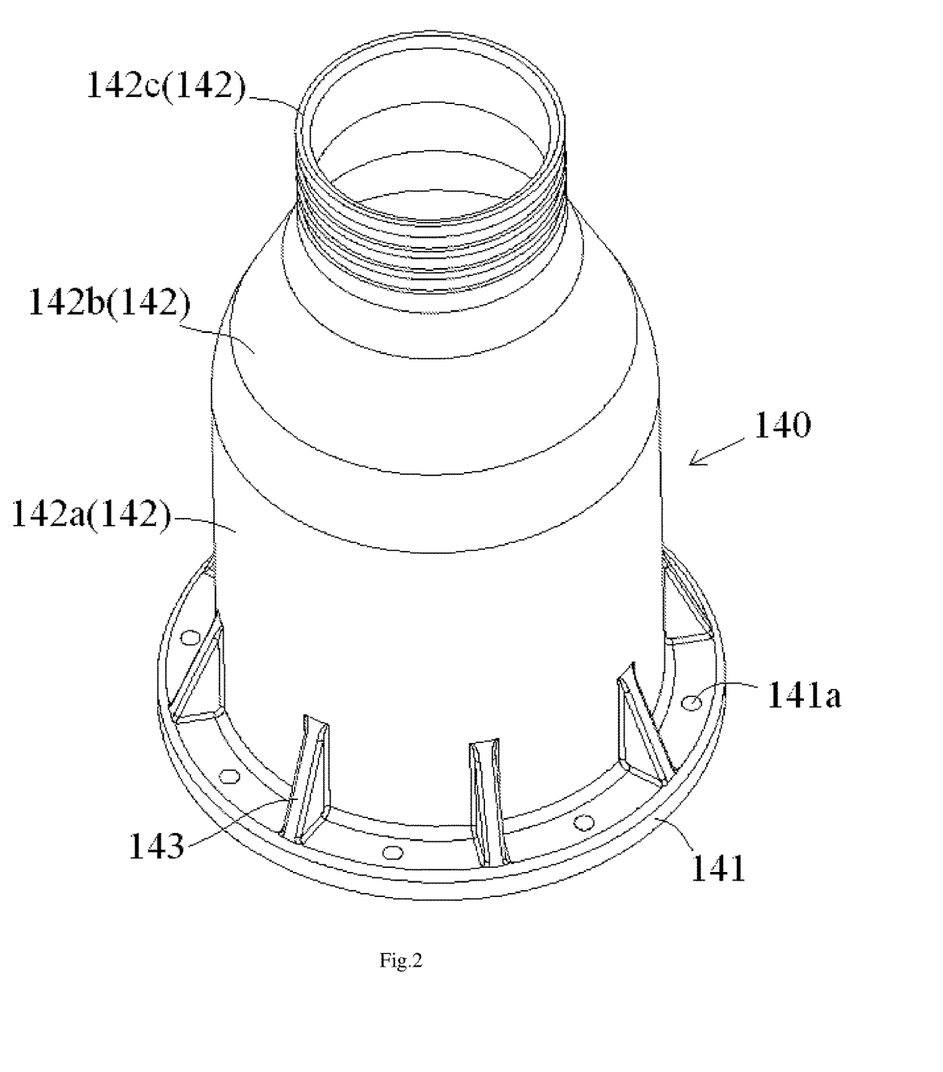
FIG. 2 is a perspective view of an insulation base of the insulation assembly of FIG. 1.

An insulation assembly according to an embodiment of the invention is shown in FIGS. 1 and 2. The insulation assembly comprises an insulation pipe 120, an insulation umbrella group 130, and an insulation base 140. The insulation pipe 120 has a first end 120a and a second end 120b opposite to the first end 120a. The insulation umbrella group 130 is formed on an outer wall of the insulation pipe 120. The insulation base 140 is made of insulating material and is connected to the first end 120a of the insulation pipe 120. The insulation assembly of the present disclosure is applicable to a transformer, a circuit breaker, or any power device that requires insulation.

In an embodiment, the insulation umbrella group 130 is a silicone rubber umbrella group molded on the outer wall of the insulation pipe 120, as shown in FIG. 1. The insulation pipe 120 is a winding pipe formed by winding glass fiber impregnated with epoxy resin. The insulation base 140 may be any suitable insulation material. In an embodiment, the insulation material suitable for the insulation base 140 should have excellent physical and chemical characteristics, such as high mechanical strength, light weight, resistance to cracking, and so on. In an exemplary embodiment, the insulation material suitable for the insulation base 140 is an epoxy resin.

In an embodiment, the insulation base 140 and the insulation pipe 120 may be made of the same insulation material or different insulation material with same or similar thermal expansion coefficient. In this way, a gap is prevented from forming between the insulation base 140 and the insulation pipe 120.

In an embodiment, the insulation base 140 is made of a fiber material impregnated with a curable agent. The fiber material used to manufacture the insulation base 140 may comprise man-made fiber or natural plant fiber. In an embodiment, the man-made fiber is at least one of glass fiber, Kevlar fiber, aramid fiber, nylon fiber, high density polyethylene fiber, and high or ultra-high molecular weight polyethylene fiber. In various embodiments, the fiber material used to manufacture the insulation base 140 may have a length within a range of 1 millimeters to 300 millimeters, within a range of 10 millimeters to 150 millimeters, or within a range of 5 millimeters to 100 millimeters. The curable agent is an epoxy resin in an embodiment. The curable agent may comprise bisphenol A epoxy and anhydride.

A protection coating layer may be formed on an outer surface of the insulation base 140 so as to improve the aging resistance and the electrical properties of the insulation base 140. In an embodiment, the protection coating layer has flame retardant, anti-current leakage or anti-aging properties. The protection coating layer comprises silicon rubber and filler filled in the silicone rubber in an embodiment. The filler is at least one of Silicon powder, alumina, Zinc Oxide, Magnesium Oxide, boron nitride, titanium dioxide, and iron oxide red. The protection coating layer may be formed on the outer surface of the insulation base 140 by molding, spraying or hand brushing. The liquid material for forming the protection coating layer may be cured and solidified at a temperature equal to or higher than room temperature.

As shown in FIG. 1, an insulation gas or an insulation liquid may fill an inner space 101 of the insulation pipe 120. For example, SF6 gas is filled in the inner space 101 of the insulation pipe 120 so as to improve the electric insulation performance of the insulation assembly.

As shown in FIGS. 1-2, the insulation base 140 comprises an insulation flange 141 and an insulation connection tube 142. A first end of the insulation connection tube 142 is connected to the first end 120a of the insulation pipe 120 and an opposite second end of the insulation connection tube 142 is connected to the insulation flange 141. The insulation base 140 has a plurality of reinforcing ribs 143 each connected to outer walls of the insulation flange 141 and the insulation connection tube 142 to increase a connection strength between the insulation flange 141 and the insulation connection tube 142.

The plurality of reinforcing ribs 143, as shown in FIG. 2, are uniformly distributed and spaced around a circumference of the insulation connection tube 142. The reinforcing ribs 143 improve the mechanical properties of the insulation base 140 and increase the mechanical strength of the insulation base 140. A plurality of installation holes 141a are formed in the insulation flange 141, each of the installation holes 141a is located at a middle position between two adjacent insulation reinforcing ribs 143. The insulation base 140 may be connected to, for example, a housing of an electric apparatus (not shown) by screwing a plurality of screws (not shown) into the plurality of installation holes 141a.

In an embodiment, the insulation base 140 is a single member formed by a single molding process; the insulation flange 141, the insulation tube 142, the insulation reinforcing ribs 143 and the installation holes 141a are formed at the same time, reducing the cost of the insulation base 140.

As shown in FIGS. 1-2, the insulation connection tube 142 has various diameters along its length. The insulation connection tube 142 has a first tube portion 142c located at the first end of the insulation connection tube 142 distal from the insulation flange 141, a second tube portion 142a located at the second end of the insulation connection tube 142 proximal to the insulation flange 141, and a third tube portion 142b connected between the first tube portion 142c and the second tube portion 142a. The first tube portion 142c has a first constant outer diameter, the second tube portion 142a has a second constant outer diameter larger than the first outer diameter, and the third tube portion 142b has a third outer diameter gradually changing from the first constant outer diameter to the second constant outer diameter.

Figure 3:
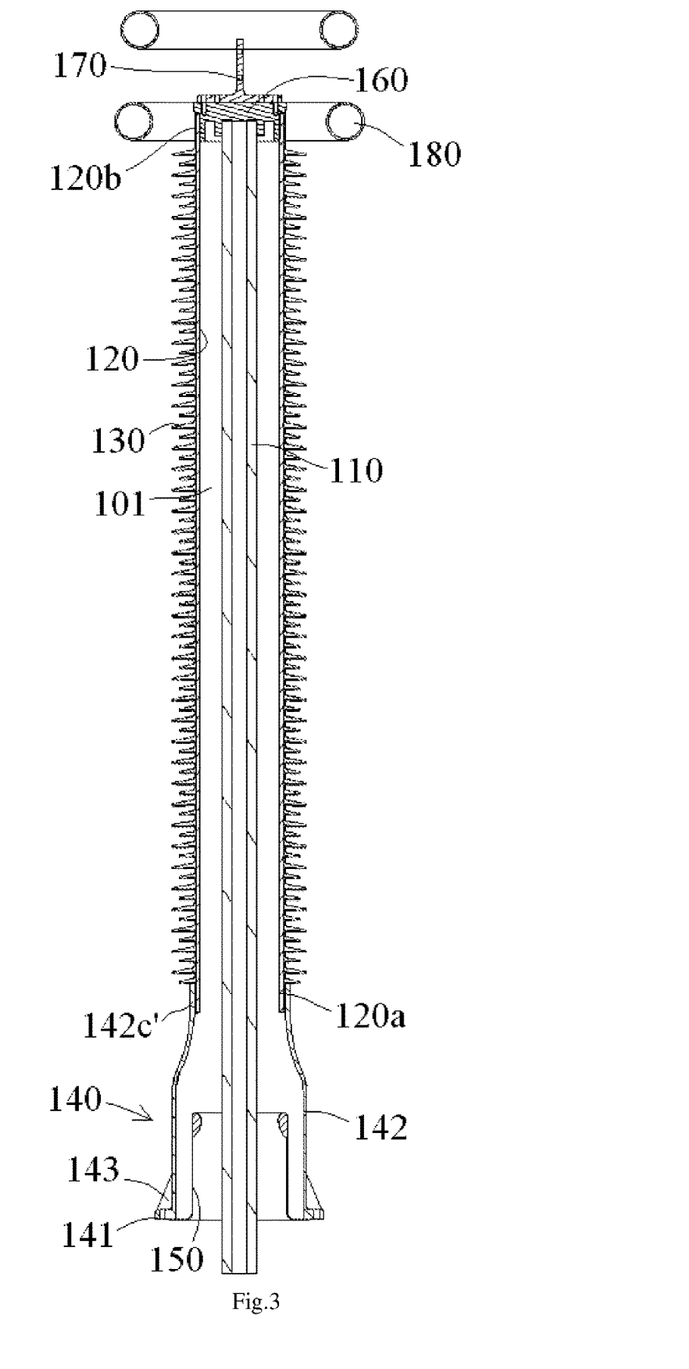
FIG. 3 is a sectional view of an insulation assembly according to another embodiment of the invention.

As shown in FIGS. 1-2, an inner diameter of the insulation pipe 120 is slightly larger than an outer diameter of the first tube portion 142c of the insulation connection tube 142. The first end 120a of the insulation pipe 120 is sleeved and connected to the outer wall of the first tube portion 142c of the insulation connection tube 142. In another embodiment shown in FIG. 3, an outer diameter of the insulation pipe 120 is slightly less than an inner diameter of the first tube portion 142c' of the insulation connection tube 142. The first tube portion 142c' of the insulation connection tube 142 is sleeved and connected to the outer wall of the first end 120a of the insulation pipe 120.

The insulation pipe 120 is connected to the first tube portion 142c having the smallest diameter, thereby, it does not need to match the insulation pipe 120 with the insulation flange 141 having the largest diameter. The required diameter of the insulation pipe 120 is reduced, saving the material to manufacture the insulation pipe 120 and decreasing the cost of the insulation pipe 120. The second tube portion 142a of the insulation connection tube 142 is where the electric field is relatively concentrated. Thereby, the inner diameter of the second tube portion 142a is designed to be larger than the inner diameter of the first tube portion 142c, so as to form a uniform electric field at the second tube portion 142a. The diameter of the insulation connection tube 142 does not need to be designed to be equal to the diameter of the insulation flange 141, saving the material to manufacture the insulation connection tube 142.

As shown in FIG. 1, the insulation assembly further comprises an end cover 160 mounted on and sealing the second end 120b of the insulation pipe 120. A conductor 110 from the electric apparatus (not shown), for example, a transformer or circuit breaker, may be introduced into the insulation pipe 120 through an inlet of the first end 120a of the insulation pipe 120 and electrically connected to the end cover 160 mounted on an outlet of the second end 120b of the insulation pipe 120.

As shown in FIGS. 1-2, the insulation assembly further comprises a wire connection bar 170 mounted on a top wall of the end cover 160. The wire connection bar 170 may be detachably mounted on the top wall of the end cover 160, for example, by screws. The insulation assembly further comprises a shielding ring 180 mounted on the top wall of the end cover 160 around the wire connection bar 170. The shielding ring 180 is used to uniform the electric field at the wire connection bar 170, so as to prevent an electric field concentration at the wire connection bar 170.

As shown in FIGS. 1-2, the insulation assembly further comprises a shielding sleeve 150 provided on the insulation base 140 and extending into the insulation connection tube 142 and/or the insulation pipe 120. The shielding sleeve 150 is used to uniform the electric field generated by the conductor 110 at the insulation base 140, so as to prevent an electric field concentration at the insulation base 140. A slot is formed in a bottom surface of the insulation flange 141 and a flange of the shielding sleeve 150 is adapted to be fitted in the slot of the insulation flange 141.

Figure 4:
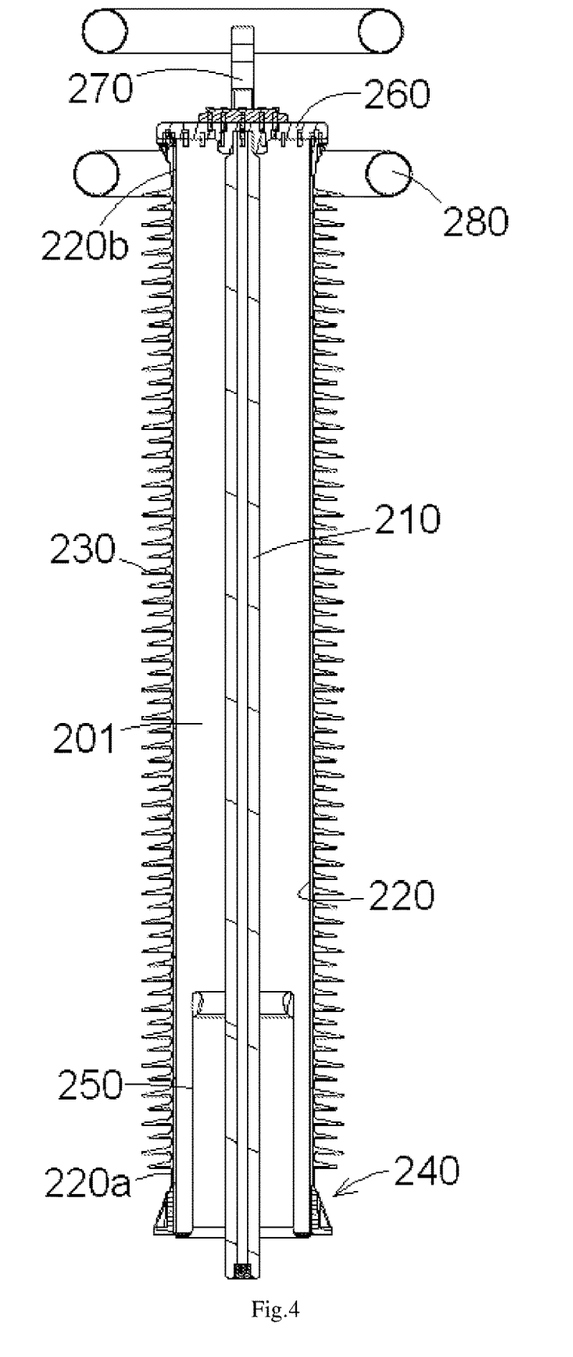
FIG. 4 is a sectional view of an insulation assembly according to another embodiment of the invention.
Figure 5:
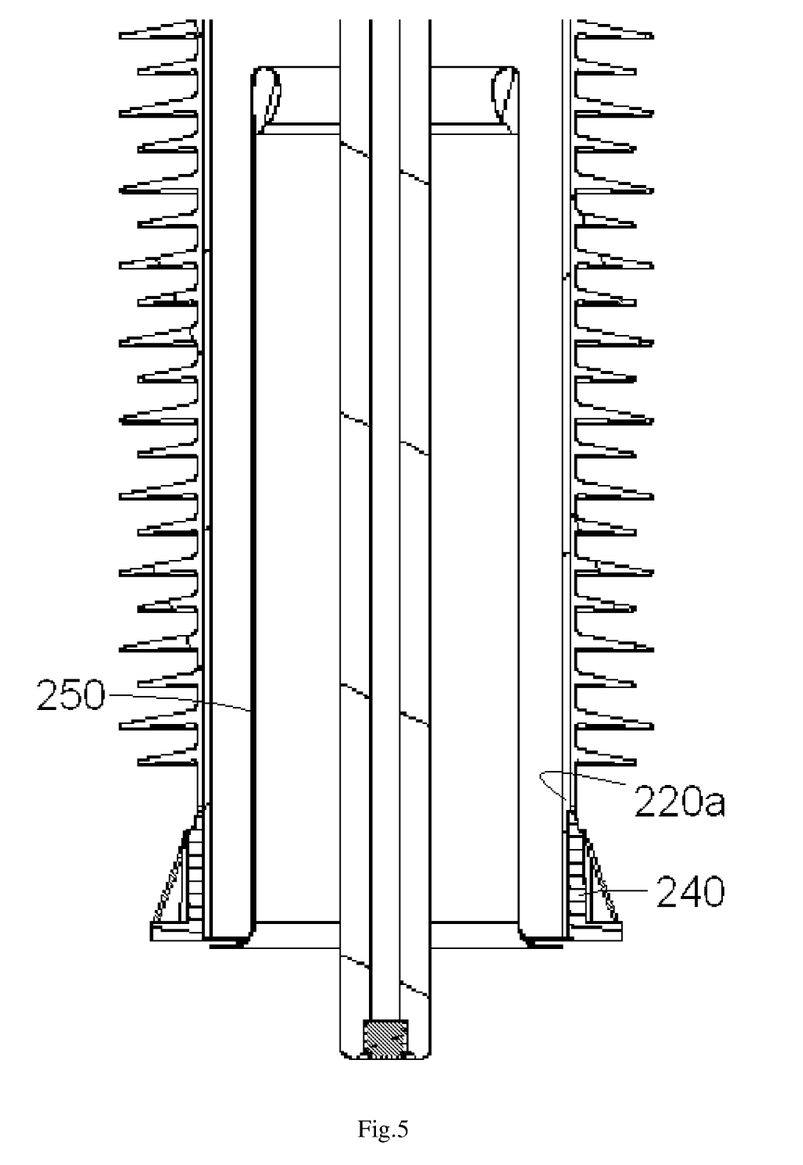
FIG. 5 is an enlarged view of the insulation assembly of FIG. 4.
Figure 6:
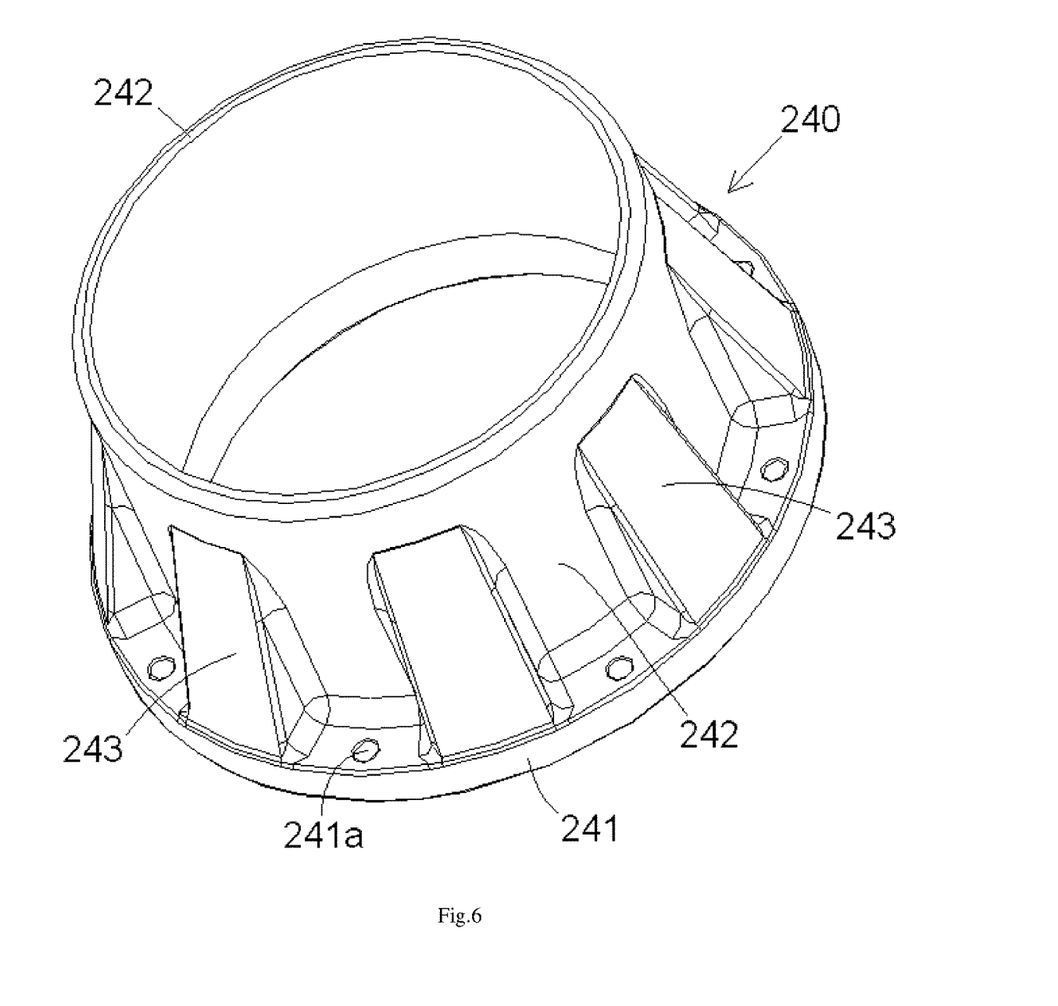
FIG. 6 is a perspective view of an insulation base of the insulation assembly of FIG. 4.

An insulation assembly according to another embodiment of the invention is shown in FIGS. 4-6. The insulation assembly comprises an insulation pipe 220, an insulation umbrella group 230 and an insulation base 240. The insulation pipe 220 has a first end 220a and a second end 220b opposite to the first end 220a. The insulation umbrella group 230 is formed on an outer wall of the insulation pipe 220. The insulation base 240 is made of insulating material and connected to the first end 220a of the insulation pipe 220. The insulation assembly of the present disclosure is applicable to a transformer, a circuit breaker, or any power device that requires insulation.

In an embodiment, the insulation umbrella group 230 may be a silicone rubber umbrella group molded on the outer wall of the insulation pipe 220, as shown in FIG. 4. The insulation pipe 220 may be a winding pipe formed by winding glass fiber impregnated with epoxy resin. The insulation base 240 may be made of any suitable insulation material. In an embodiment, the insulation material suitable for the insulation base 240 should have excellent physical and chemical characteristics, such as, high mechanical strength, light weight, resistance to cracking, and so on. In an exemplary embodiment, the insulation material suitable for the insulation base 240 is an epoxy resin.

In an embodiment, the insulation base 240 and the insulation pipe 220 may be made of the same insulation material or different insulation material with same or similar thermal expansion coefficient. In this way, a gap is prevented from forming between the insulation base 240 and the insulation pipe 220.

In an embodiment, the insulation base 240 is made of a fiber material impregnated with a curable agent. The fiber material used to manufacture the insulation base 240 may comprise man-made fiber or natural plant fiber. In an embodiment, the man-made fiber is at least one of glass fiber, Kevlar fiber, aramid fiber, nylon fiber, high density polyethylene fiber, and high or ultra-high molecular weight polyethylene fiber. In various embodiments, the fiber material used to manufacture the insulation base 140 may have a length within a range of 1 millimeters to 300 millimeters, within a range of 10 millimeters to 150 millimeters, or within a range of 5 millimeters to 100 millimeters. The curable agent is an epoxy resin in an embodiment. The curable agent may comprise bisphenol A epoxy and anhydride.

A protection coating layer may be formed on an outer surface of the insulation base 240 so as to improve the aging resistance and the electrical properties of the insulation base 240. In an embodiment, the protection coating layer has flame retardant, anti-current leakage or anti-aging properties. The protection coating layer comprises silicon rubber and filler filled in the silicone rubber in an embodiment. The filler is at least one of Silicon powder, alumina, Zinc Oxide, Magnesium Oxide, boron nitride, titanium dioxide, and iron oxide red. The protection coating layer may be formed on the outer surface of the insulation base 240 by molding, spraying or hand brushing. The liquid material for forming the protection coating layer may be cured and solidified at a temperature equal to or higher than room temperature.

As shown in FIG. 4, an insulation gas or an insulation liquid may fill an inner space 201 of the insulation pipe 220. For example, SF6 gas is filled in the inner space 201 of the insulation pipe 220 so as to improve the electric insulation performance of the insulation assembly.

As shown in FIGS. 4-6, the insulation base 240 comprises an insulation flange 241 and an insulation connection tube 242. A first end of the insulation connection tube 242 is connected to the first end 220a of the insulation pipe 220 and an opposite second end of the insulation connection tube 242 is connected to the insulation flange 241. The insulation base 240 has a plurality of reinforcing ribs 243 each connected to outer walls of the insulation flange 241 and the insulation connection tube 242 to increase a connection strength between the insulation flange 241 and the insulation connection tube 242.

The plurality of reinforcing ribs 243, as shown in FIG. 6, are uniformly distributed and spaced around a circumference of the insulation connection tube 242. The reinforcing ribs 243 improve the mechanical properties of the insulation base 240 and increase the mechanical strength of the insulation base 240 A plurality of installation holes 241a are formed in the insulation flange 241, each of the installation holes 241a is located at a middle position between two adjacent insulation reinforcing ribs 243. The insulation base 240 may be connected to, for example, a housing of an electric apparatus (not shown) by screwing a plurality of screws (not shown) into the plurality of installation holes 241a.

In an embodiment, the insulation base 240 is a single member formed by a single molding process; the insulation flange 241, the insulation tube 242, the insulation reinforcing ribs 243 and the installation holes 241a are formed at the same time, reducing the cost of the insulation base 240.

As shown in FIGS. 4-6, the insulation connection tube 242 has a constant diameter. An inner diameter of the insulation pipe 220 is slightly larger than an outer diameter of the insulation connection tube 242. The first end 220a of the insulation pipe 220 is sleeved and connected to the outer wall of the one end of the insulation connection tube 242. In other embodiments, an outer diameter of the insulation pipe 220 may be slightly less than an inner diameter of the insulation connection tube 242. In this case, the insulation connection tube 242 may be sleeved and connected to the outer wall of the first end of the insulation pipe 220.

As shown in FIG. 4, the insulation assembly further comprises an end cover 260 mounted on and sealing the second end 220b of the insulation pipe 220. A conductor 210 from the electric apparatus (not shown), for example, a transformer or circuit breaker, may be introduced into the insulation pipe 220 through an inlet of the first end 220a of the insulation pipe 220 and electrically connected to the end cover 260 mounted on an outlet of the second end 220b of the insulation pipe 220.

As shown in FIGS. 4-6, the insulation assembly further comprises a wire connection bar 270 mounted on a top wall of the end cover 260. The wire connection bar 270 may be detachably mounted on the top wall of the end cover 260, for example, by screws. The insulation assembly further comprises a shielding ring 280 mounted on the top wall of the end cover 260 around the wire connection bar 270. The shielding ring 280 is used to uniform the electric field at the wire connection bar 270, so as to prevent an electric field concentration at the wire connection bar 270.

As shown in FIGS. 4-6, the insulation assembly further comprises a shielding sleeve 250 provided on the insulation base 240 and extending into the insulation connection tube 242 and/or the insulation pipe 220. The shielding sleeve 250 is used to uniform the electric field generated by the conductor 210 at the insulation base 240, so as to prevent an electric field concentration at the insulation base 240. A slot is formed in a bottom surface of the insulation flange 241 and a flange of the shielding sleeve 250 is adapted to be fitted in the slot of the insulation flange 241.

In the above exemplary embodiments, the base 140, 240 connected to the insulation pipe 120, 220 is made of insulation material, instead of metal, reducing the cost of the insulation assembly. Further, the insulation base 140, 240 and the insulation pipe 120, 220 both are made of insulation material, improving the connection strength between the insulation base 140, 240 and the insulation pipe 120, 220. Also, the insulation base 140, 240 made of insulation material has a same or similar thermal expansion coefficient as the insulation pipe 120, 220 made of insulation material; a gap is unlikely to occur between the insulation base 140, 240 and the insulation pipe 120, 220, improving the sealing performance of the insulation assembly.

What is claimed is:

1. An insulation assembly, comprising:
an insulation pipe having a first end and a second end opposite to the first end;
an insulation umbrella group formed on an outer wall of the insulation pipe; and
an insulation base made of an insulating material and connected to the first end of the insulation pipe, the insulation base has an insulation flange and an insulation connection tube, a first end of the insulation connection tube is connected to the first end of the insulation pipe and a second end of the insulation connection tube opposite to the first end is connected to the insulation flange.

2. The insulation assembly of claim 1, wherein the insulation base has a plurality of reinforcing ribs each connected to outer walls of the insulation flange and the insulation connection tube.

3. The insulation assembly of claim 2, wherein the reinforcing ribs are uniformly distributed and spaced around a circumference of the insulation connection tube.

4. The insulation assembly of claim 3, wherein a plurality of installation holes are formed in the insulation flange, each of the installation holes disposed at a middle position between adjacent reinforcing ribs of the plurality of reinforcing ribs.

5. The insulation assembly of claim 1, wherein the insulation base is integrally formed by molding.

6. The insulation assembly of claim 1, wherein the insulation connection tube has a constant diameter.

7. The insulation assembly of claim 6, wherein an inner diameter of the insulation pipe is larger than an outer diameter of the insulation connection tube and the first end of the insulation pipe is sleeved and connected to an outer wall of the first end of the insulation connection tube.

8. The insulation assembly of claim 6, wherein an outer diameter of the insulation pipe is less than an inner diameter of the insulation connection tube and the first end of the insulation connection tube is sleeved and connected to the outer wall of the first end of the insulation pipe.

9. The insulation assembly of claim 1, wherein the insulation connection tube has a plurality of different diameters.

10. The insulation assembly of claim 9, wherein the insulation connection tube has:
   (a) a first tube portion disposed at the first end of the insulation connection tube distal from the insulation flange, the first tube portion having a first constant outer diameter,
   (b) a second tube portion disposed at the second end of the insulation connection tube proximal the insulation flange, the second tube portion having a second constant outer diameter greater than the first constant outer diameter, and
   (c) a third tube portion connected between the first tube portion and the second tube portion, the third tube portion having a third outer diameter gradually changing from the first constant outer diameter to the second constant outer diameter.

11. The insulation assembly of claim 10, wherein an inner diameter of the insulation pipe is larger than an outer diameter of the first tube portion of the insulation connection tube and the first end of the insulation pipe is sleeved and connected to an outer wall of the first tube portion of the insulation connection tube.

12. The insulation assembly of claim 10, wherein an outer diameter of the insulation pipe is less than an inner diameter of the first tube portion of the insulation connection tube and the first tube portion of the insulation connection tube is sleeved and connected to the outer wall of the first end of the insulation pipe.

13. The insulation assembly of claim 1, further comprising an end cover mounted on the second end of the insulation pipe.

14. The insulation assembly of claim 13, wherein an insulation gas of an insulation liquid is filled in an inner space of the insulation pipe.

15. The insulation assembly of claim 13, further comprising a wire connection bar mounted on a top wall of the end cover.

16. The insulation assembly of claim 15, further comprising a shielding ring mounted on the top wall of the end cover around the wire connection bar.

17. The insulation assembly of claim 1, further comprising a shielding sleeve disposed on the insulation base and extending into the insulation connection tube and/or the insulation pipe.

18. The insulation assembly of claim 17, wherein a slot is formed in a bottom surface of the insulation flange and a flange of the shielding sleeve fits in the slot of the insulation flange.

19. The insulation assembly of claim 1, wherein the insulation base and the insulation pipe are formed of a same insulation material.

20. The insulation assembly of claim 1, wherein the insulation base is a fiber material impregnated with a curable agent.

21. The insulation assembly of claim 20, wherein the fiber material is a man-made fiber or a natural plant fiber.

22. The insulation assembly of claim 21, wherein the man-made fiber is at least one of glass fiber, Kevlar fiber, aramid fiber, nylon fiber, high density polyethylene fiber, and high or ultra high molecular weight polyethylene fiber.

23. The insulation assembly of claim 20, wherein the fiber material has a length within a range of 1 millimeter to 300 millimeters.

24. The insulation assembly of claim 20, wherein the fiber material has a length within a range 10 millimeters to 150 millimeters.

25. The insulation assembly of claim 20, wherein the fiber material has a length within a range of 5 millimeters to 100 millimeters.

26. The insulation assembly of claim 20, wherein the curable agent is an epoxy resin.

27. The insulation assembly of claim 20, wherein the curable agent has bisphenol A epoxy and anhydride.

28. The insulation assembly of claim 1, further comprising a protection coating layer with flame retardant, anti-current leakage, or anti-aging properties formed on an outer surface of the insulation base.

29. The insulation assembly of claim 28, wherein the protection coating layer has a silicon rubber and a filler filled in the silicon rubber, the filler is at least one of silicon powder, alumina, zinc oxide, magnesium oxide, boron nitride, titanium dioxide, and iron oxide red.

30. The insulation assembly of claim 28, wherein a liquid material forming the protection coating layer is capable of being cured and solidified at a temperature equal to or higher than a room temperature.

* * * * *

UNITED STATES PATENT AND TRADEMARK OFFICE
CERTIFICATE OF CORRECTION

PATENT NO.         : 10,410,770 B2
APPLICATION NO.    : 15/816633
DATED              : September 10, 2019
INVENTOR(S)        : Yuezhong Tan et al.

Page 1 of 1

It is certified that error appears in the above-identified patent and that said Letters Patent is hereby corrected as shown below:

On the Title Page

Under (30) Foreign Application Priority Data:
Aug. 30, 2016 (CN) ........ 2016 1 01980671
Should read:
-- March 30, 2016 (CN) ........ 2016 1 0190671 --

Signed and Sealed this
Twenty-fourth Day of March, 2020

Andrei Iancu
*Director of the United States Patent and Trademark Office*